United States Patent [19]

Turner et al.

[11] Patent Number: 5,224,899

[45] Date of Patent: * Jul. 6, 1993

[54] INNER MEMBER WITH THREE ARMS, EACH ARM HAVING A ROLLER ASSEMBLY WITH AN OUTER ROLLER CONSTRAINED AGAINST TILTING IN THE GROOVE

[75] Inventors: Colin F. S. Turner; Colin A. Bird, both of Sutton Coldfield, England

[73] Assignee: Hardy Spicer Limited, England

[*] Notice: The portion of the term of this patent subsequent to Apr. 20, 2010 has been disclaimed.

[21] Appl. No.: 689,779

[22] PCT Filed: Nov. 21, 1989

[86] PCT No.: PCT/GB89/01386

§ 371 Date: May 15, 1991

§ 102(e) Date: May 15, 1991

[87] PCT Pub. No.: WO90/06452

PCT Pub. Date: Jun. 14, 1990

[30] Foreign Application Priority Data

Nov. 26, 1988 [GB] United Kingdom ............... 8827655

[51] Int. Cl.$^5$ .............................................. F16D 3/205
[52] U.S. Cl. .................................... 464/111; 464/124; 464/905
[58] Field of Search ................ 469/111, 120, 122, 123, 469/124, 132, 505

[56] References Cited

U.S. PATENT DOCUMENTS 3,029,617 4/1962 Marquis et al.
4,192,154 3/1980 Nakamura et al. ............. 464/123 X
4,589,856 5/1986 Mazziotti et al. .................. 464/111

FOREIGN PATENT DOCUMENTS 1442991 8/1966 France.
2610681 8/1988 France.
2195167 3/1988 United Kingdom.
2204659 11/1988 United Kingdom.

Primary Examiner—Daniel P. Stodola
Assistant Examiner—William G. Battista, Jr.
Attorney, Agent, or Firm—Marshall, O'Toole, Gerstein, Murray & Borun

[57] ABSTRACT

A constant velocity ratio universal joint of the tripod type comprising a hollow outer joint member having a rotational axis and three interior guide grooves parallel to its rotational axis and equally circumferentially spaced thereabout, each guide groove having a base portion and opposed side portions; an inner joint member, inside the outer joint member, having a rotational axis and three arms equally spaced about this rotational axis and extending radially into the outer member guide grooves; each arm carrying a roller assembly with an outer roller element having an external surface engaging opposed side portions of a guide groove; an inner roller element mounted on the arm and supporting the outer roller element so that the outer roller element can rotate about, move lengthwise of, and tilt relative to the arm; and a guide element engaging the base portion of the guide groove for sliding movement therealong and also engaging the outer roller element to constrain the outer roller element against tilting relative to the guide groove.

7 Claims, 2 Drawing Sheets

CONSTANT VELOCITY UNIVERSAL JOINT

This invention relates to constant velocity ratio universal joints of the tripod type. A joint of the type to which the invention relates comprises an outer joint member having a rotational axis and three guide grooves extending parallel to its rotational axis and equally circumferentially spaced thereabout; an inner joint member disposed inside the outer member, having a rotational axis and three arms equally spaced about this rotational axis extending radially into the guide grooves of the outer joint member; each arm carrying a roller having an external surface which engages opposed side portions of the corresponding guide groove so that the roller is constrained to roll therealong; each roller being able to rotate about, slide lengthwise of, and tilt relative to the arm by which it is carried. Such a joint will hereafter be referred to as a tripod joint of the kind specified.

In a tripod joint of the kind specified, the constraint of each roller to rolling movement along its respective guide groove in the outer joint member, without tilting relative thereto, means that the joint has a reduced frictional resistance to plunge (i.e. relative axial movement between the outer and inner joint members) and rotation when the joint is articulated. When the joint rotates in the articulated condition, each roller tilts relative to the arm by which it is carried rather than relative to the groove in which it is engaged. It will be appreciated that if the roller tilted relative to the groove, it would not be able to roll along the groove but would have to slide therealong in the tilted condition, which obviously would produce a greater frictional resistance to such movement.

More particularly, the present invention relates to means by which each roller is constrained within its respective guide groove to remain aligned and not tilt therein.

An example of a tripod joint of the kind specified is disclosed in JP-UM Laid Open No. 63-57822 In this joint, each arm of the inner joint member has a cylindrical surface and each roller comprises inner and outer roller elements with interengaging part-spherical surfaces. A needle roller bearing assembly is disposed between the internal surface of the inner roller element and the cylindrical surface of the arm. The outer roller element is able to tilt relative to the arm by virtue of the interengaging part-spherical surfaces of the inner and outer roller elements, while both the inner and outer roller elements together are able to rotate about the arm and slide lengthways of the arm, such rotational and sliding movement together taking place at the needle roller bearing between the internal surface of the inner roller element and the outer cylindrical surface of the arm.

In JP-UM 63-57822, the outer peripheral surface of the outer roller element is toroidal, i.e. it is a surface of rotation, about the axis of the roller, of an arc which, in a section through the roller element viewed lengthwise of the guide groove in the outer joint member, has a radius of curvature smaller than the outer diameter of the outer roller element. Each side portion of the guide groove, where it is engaged by the outer roller element is of "gothic arch" section, comprising two arcuate portions with different centres of curvature so that the outer peripheral surface of the outer roller element contacts the groove side portion at two points (although it will be appreciated that when under load the roller/groove engagement is through small elliptical areas of contact rather than at true points). This condition, referred to as angular contact, provides for a reduction of friction between the outer roller element and groove when rolling therealong, and also such a configuration resists tilting of the outer roller element within the groove.

In practice the effectiveness of the angular contact between roller and groove in preventing the roller from tilting is subject to tolerances which inevitably are present when these components are mass produced. If the roller element fitted in the groove with no backlash (clearance) whatsoever, then it would be impossible for the roller element to tilt within the groove. If, however, as will in practice be the case, the roller element is not a perfect fit in the groove and there is some clearance or backlash therebetween, the roller element will be able to tilt within the groove to a small extent. This is particularly a problem when the joint is transmitting little or no torque, when the roller element is free to tilt until the clearance between it and the groove is taken up.

A further example of a tripod joint of the kind specified is disclosed in GB 2 195 167A. In this joint, each roller comprises an inside ring and an outside ring of which the inside ring has a spherical outer periphery and the outside ring has a cylindrical inner periphery, these peripheral surfaces of the inside and outside rings being in contact with one another. The inside ring is received on the associated arm of the inner joint member with an interposed needle roller bearing. Various expedients are disclosed for guiding the outside roller ring to remain aligned relative to the outer joint member, including appropriately shaping the external surface of the outside ring and the opposed side portions of the guide groove in the outer joint member which it engages. A shoulder engagable with the outside ring of the roller is also disclosed, for restricting deflection of the outside ring to a minimum. However, all these expedients are subject to the above described problems of manufacturing tolerances, and under certain circumstances may not guide the outside ring as effectively as is desirable.

It is the object of the present invention to provide a tripod joint of the kind specified which has an improved means for guiding each roller so as to remain in the correct orientation and not tilt relative to its guide groove in the outer joint member.

According to the present invention, we provide a tripod joint of the kind specified comprising a respective guide element in each guide groove, the guide element engaging a base portion of the guide groove for sliding movement therealong and also engaging diametrically opposed parts of the associated roller to constrain the roller against tilting in the guide groove.

Preferably the guide element comprises a flat base portion which has face to face engagement with said base portion of the guide groove for sliding therealong, and two limbs extending radially inwardly (of the outer joint member) from opposite ends of said base portion, to engage said diametrically opposed parts of the roller.

Each radially inwardly extending limb of the guide member may include a formation which engages an end face of the roller and a formation which engages the external peripheral surface of the roller. This ensures that the guide element effectively constrains the roller against tilting, and also is moved lengthwise of the guide groove when the roller rolls therealong.

Because it engages the roller at diametrically opposed parts thereof, and thus is relatively long, the guide element of a joint according to the invention can exert a sufficient couple on the roller to constrain it against tilting in the guide groove without involving large contact pressures where it engages the roller and outer joint member. Thus, although the guide element has to slide axially of the outer joint member along the base portion of the guide groove, undue frictional resistance to rolling movement of the roller along the guide groove does not result, and unacceptable wear does not occur.

A guide element according to the invention may be of resilient sheet metal, e.g. spring steel, or may be moulded of a plastics material.

In the examples described hereafter, the guide element is shown in a tripod joint which is of the general type disclosed in the Japanese Laid Open Utility Model Application aforesaid. However, the guide element is also usable more generally in tripod joints of the kind specified, for example of the type disclosed in GB 2 195 167A. When the guide element is provided, the shape of the roller external surface and the nature of its co-operation with the side portions of the guide groove in the outer joint member do not have to be such as to constrain the roller against tilting in the guide groove. The guide element can function as the sole means for preventing the roller against tilting, or merely as an auxiliary or additional means for constraining the roller against tilting under certain conditions whilst the main means for constraining against tilting is provided by the roller and guide groove configuration or by some other expedient.

The invention will now be described by way of example with reference to the accompanying drawings, of which:

Figure 1:
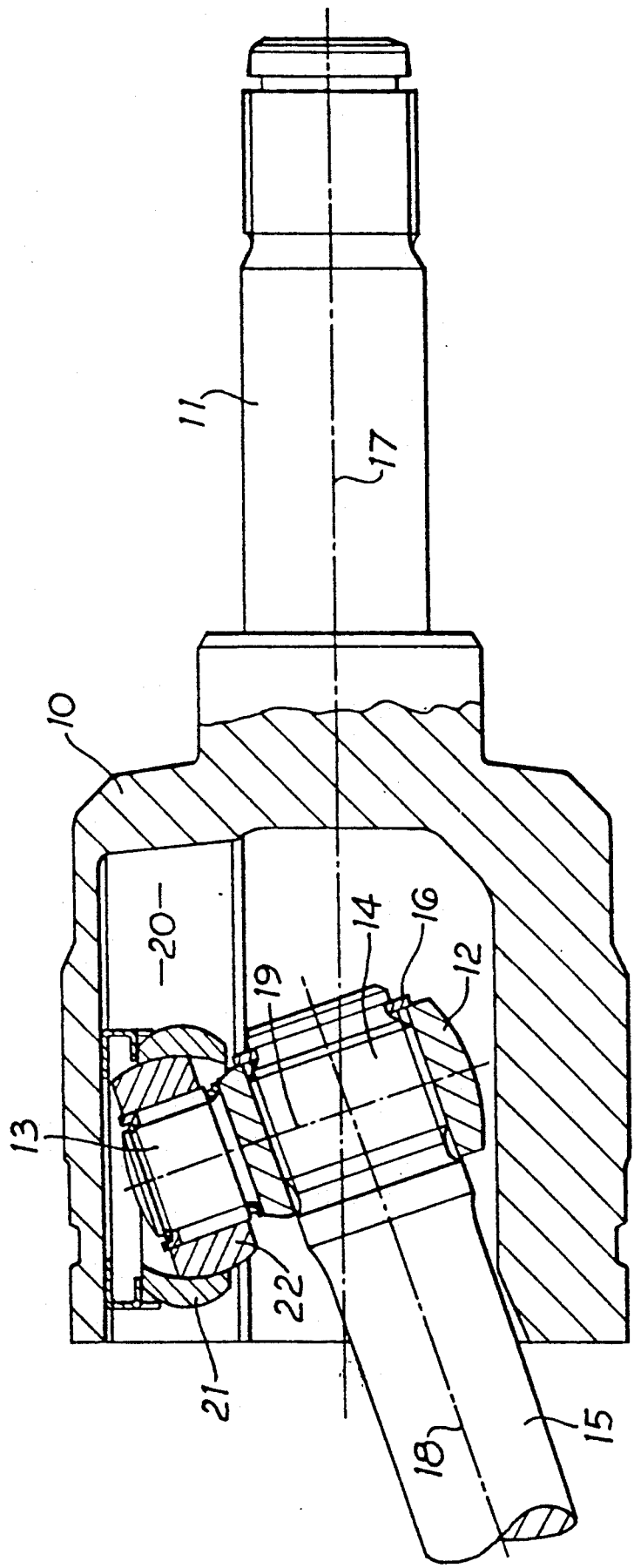
FIG. 1 is a partly sectioned elevation of a joint according to the invention, in the articulated condition.

Referring firstly to FIG. 1 of the drawings, there is shown a universal joint of the tripod type, comprising an outer joint member 10 in the form of an elongate cup-shaped component, from whose closed end a stub shaft 11 extends. Disposed within the outer joint member is an inner joint member 12, of annular form with three circumferentially equally spaced arms 13 extending radially outwardly therefrom. The interior of the inner joint member 12 is splined to have torque transmitting engagement with a splined end portion 14 of a shaft 15, being retained thereon by a circlip 16. In FIG. 1, the rotational axis of the outer joint member is indicated at 17, and that of the inner joint member at 18, the joint being depicted in the articulated condition wherein the axes 17, 18 are inclined to one another. Also shown in FIG. 1 is the axis 19 of the one arm 13 which is visible in the section shown, the axis 19 being perpendicular to the axis 18.

The interior of the outer joint member 10 is formed with three equally circumferentially spaced guide grooves 20, extending parallel to the axis 17 of the joint member. The guide grooves 20 are engaged by respective outer roller elements 21 carried by the arms 13 of the inner joint member, and these are shown in greater detail in FIGS. 2 and 3.

Figure 2:
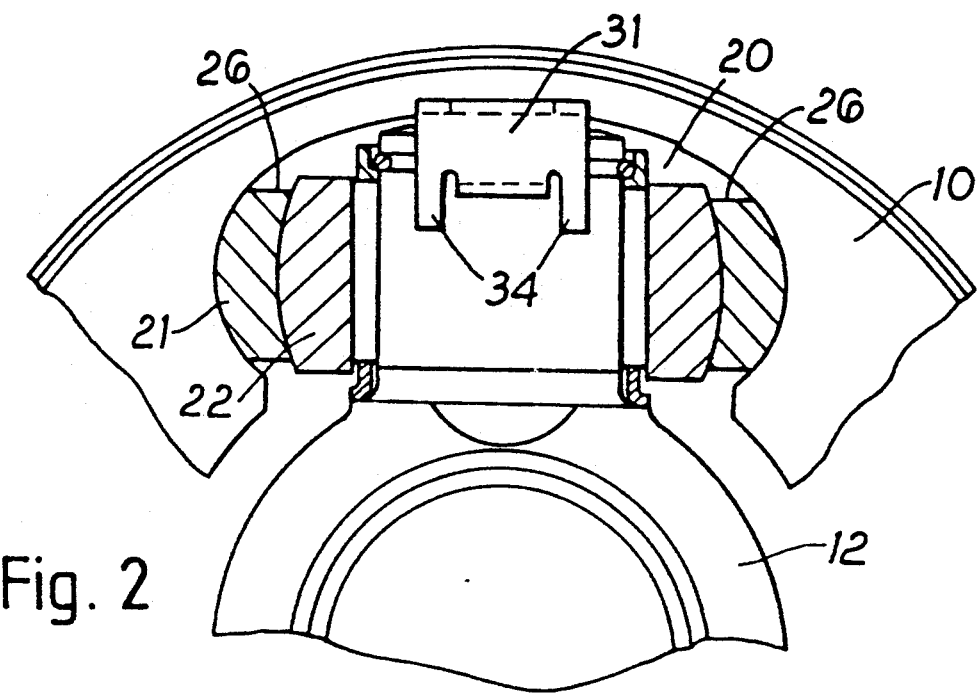
FIG. 2 is a partly sectioned end view of part of the joint of FIG. 1, shown in the non-articulated condition.

FIG. 2 shows one of the guide grooves 20 in the outer joint member 10. The groove 20 has two opposed side portions which are mirror images of one another, engaged by diametrically opposed parts of the outer roller element 21. Roller element 21 is of annular form, having an external surface which engages the opposed side portions of the groove, and an internal substantially part-spherical surface. The outer roller element 21 also has a flat end surface 26 which faces radially outwardly of the joint as a whole.

Figure 3:
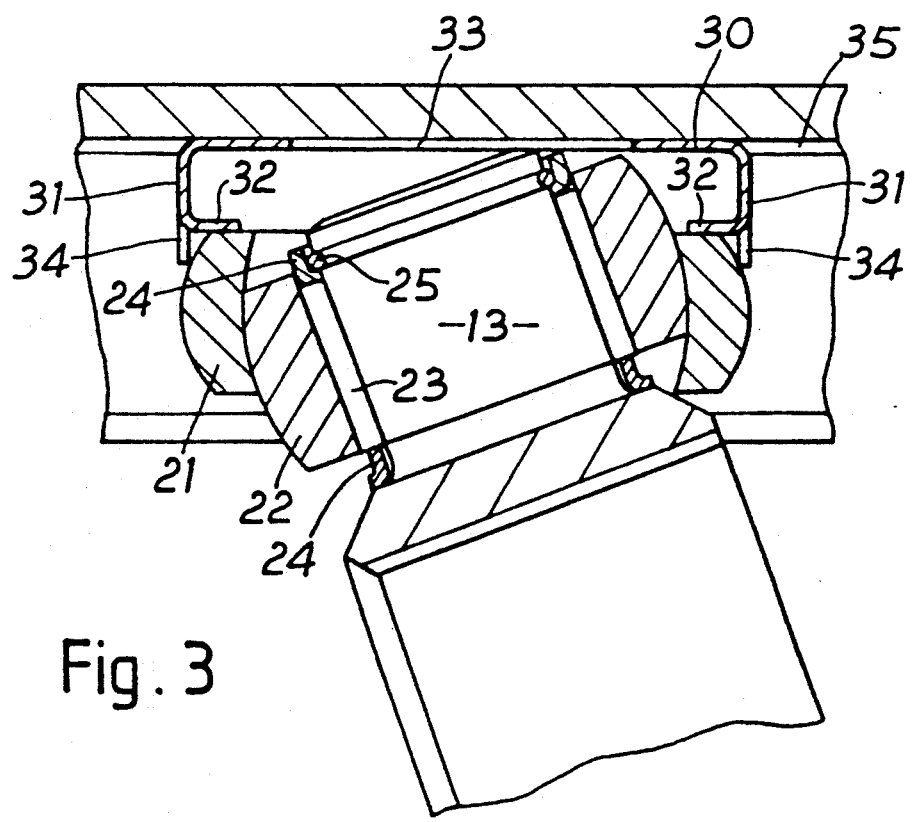
FIG. 3 is an enlargement of part of FIG. 1.

The outer roller element 21 is carried on the arm 13 by an inner roller element 22 which has a substantially part-spherical external surface engaging the internal substantially part-spherical surface of the outer roller element 21. The outer roller element 21 is thus able to tilt relative to the inner roller element 22, as shown in FIGS. 1 and 3, when the joint articulates. The outer roller element 21 and inner roller element 22 may be assembled to one another by inserting the inner roller element 22 into the outer roller element 21 while these components are oriented with their axes at right angles to one another, either being provided with cutaways to facilitate this operation or else being "sprung" together by resilient deformation of one or both of these components. The inner roller element 22 has a cylindrical internal surface, and is supported on a cylindrical surface of the arm 13 by a needle roller bearing assembly comprising a plurality of needle rollers 23 disposed circumferentially about the arm 13 and extending parallel to the axis 19 thereof. The needle rollers 23 are retained by cage rings 24 and a retaining spring ring 25 engaging a groove adjacent the end of arm 13.

The outer roller element 21 is thus able to undergo, simultaneously, three different movements relative to the arm 13. It is able to rotate about the axis 19 of the arm, to slide lengthwise of the arm 13, and to tilt relative thereto. When the joint rotates in the articulated condition, all three movements are involved.

The outer roller element 21 is constrained against tilting relative to the groove 20, so that it rolls therealong with minimum frictional resistance, by a guide element which is more clearly shown in FIGS. 2 and 3. The guide element comprises a base portion 30 which is flat and lies against a complementary base portion 35 of the guide groove 20. Two limbs 31 extend radially inwardly from the base portion 30 at opposite ends thereof. Each limb 31 terminates in two spaced tabs 34 which lie against the external peripheral surface of the roller 21, and inwardly bent tongues 32 which lie against the flat end surface 26 of the roller. The guide element is of resilient sheet metal, e.g. spring steel.

The guide element, by virtue of its engagement with the base portion 35 of guide groove 20 and also with the roller 21, constrains the roller to prevent it from tilting relative to the guide groove. This ensures that when the outer roller element 21 is caused to move along the guide groove, it rolls with minimal frictional resistance thereto and does not slide therealong as it would have to do if it tilted in the groove. Because the guide element engages the outer roller element 21 at diametrically opposed parts thereof, and as the flat base of the guide element is relatively long, it can exert a sufficient couple on the roller to prevent the latter from tilting without involving large contact pressures where it engages the outer roller element 21 and outer joint member. Thus, although the guide element has to slide axially of the outer joint member, unacceptable wear does not occur and there is no undue resistance to its movement.

The base portion 30 of the guide element is cut away at 33 to provide clearance for the end of the arm 13, when the joint is articulated. As an alternative to being made of sheet metal, the guide element could be a moulding of a plastics material having suitable wear resistant properties.

The guide element may be the sole means for constraining the outer roller element 21 against tilting in the guide groove, or may be an additional or auxiliary means for achieving this result. Thus, the configuration of the external surface of outer roller element 21 and the opposed side portions of the guide groove 20 engaged thereby may be such as to guide the outer roller element 21 to resist tilting in the guide groove. In this case, as above referred to, the problem of tilting of the roller, substantially only occurs when the joint is not transmitting torque and the guide element is effective against tilting of the outer roller element 21 primarily under this condition. On the other hand, the configuration of the external surface of the outer roller element 21 and of the side portions of the guide groove engaged thereby may be such as not to prevent the outer roller element 21 from tilting in the guide groove, in which case the guide member is the sole means for preventing the outer roller element 21 from tilting under all conditions of joint operation.

Further, it is to be appreciated that the invention is applicable generally to joints of the kind specified, irrespective of the arrangement by which the rollers of the joint are supported on the arms of the inner joint member for rotation about, lengthwise sliding, and tilting relative to the arms.

We claim:

1. A constant velocity ratio universal joint of the tripod type, comprising:

a hollow outer joint member having a rotational axis and three guide grooves provided in its interior extending parallel to its rotational axis and equally circumferentially spaced thereabout, each guide groove having a base portion and opposed side portions;

an inner joint member, disposed inside the outer joint member, having a rotational axis and three arms equally spaced about this rotational axis and extending radially into the guide grooves of the outer member;

each arm carrying a roller assembly comprising an outer roller element having an external surface which engages the opposed side portions of the corresponding guide groove so that the outer roller element is able to roll therealong; and means supporting the outer roller element so that the outer roller element is able to rotate about, move lengthwise of, and tilt relative to the arm of the inner joint member by which it is carried, said means including an inner roller element;

and a respective guide element in each guide groove, said guide element engaging the base portion of the guide groove for sliding movement therealong and said guide element also engaging parts of the associated outer roller element, and which parts are opposed diametrically of the outer roller element from one another, to constrain the outer roller element against tilting relative to the guide groove.

2. A joint according to claim 1 wherein the guide element comprises a flat base portion, in face-to-face engagement with said base portion of the guide groove, and two limbs extending radially inwardly, with respect of the outer joint member, from opposite ends of said flat base portion to engage the outer roller element.

3. A joint according to claim 2 wherein each outer roller element has an end face, each of said limbs comprises a formation engaging an end face of the outer roller element and a formation engaging the external surface of the outer roller element.

4. A joint according to any one of the preceding claims wherein the guide element is of resilient sheet metal.

5. A joint according to claims 1 to 3 wherein the guide element is of plastics material.

6. A joint according to claim 1 wherein the configuration of the outer roller element external surface and guide groove side portions engaged thereby is such as to constrain the outer roller element against tilting in the guide groove when the joint is transmitting torque.

7. A joint according to claim 1 wherein each inner roller element is slidable lengthwise of and rotatable about the respective arm, the outer roller element and inner roller element having interengaging substantially part-spherical surfaces.

* * * * *